E. T. COUSE.
TRANSMISSION MECHANISM
APPLICATION FILED OCT. 10, 1919.

1,356,601.

Patented Oct. 26, 1920.

INVENTOR
Elvin T. Couse
BY John A. Naismith
HIS ATTORNEY

UNITED STATES PATENT OFFICE.

ELVIN T. COUSE, OF SAN JOSE, CALIFORNIA.

TRANSMISSION MECHANISM.

1,356,601.　　　　Specification of Letters Patent.　　Patented Oct. 26, 1920.

Application filed October 10, 1919.　Serial No. 329,665.

*To all whom it may concern:*

Be it known that I, ELVIN T. COUSE, a citizen of the United States, and resident of San Jose, in the county of Santa Clara and State of California, have invented certain new and useful Improvements in Transmission Mechanisms, of which the following is a specification.

My invention relates particularly to the differential gearing of a transmission mechanism.

It is the object of my invention to provide a simple and efficient mechanism of the character indicated whereby either side of a differential gearing may be controlled at will by the operator of the machine in which it is used.

Figure 1:
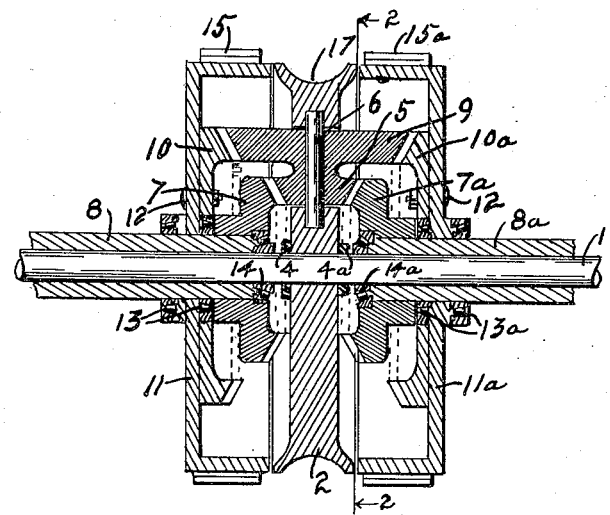
Figure 1 is a sectional view through the device on line 1—1 of Fig. 2, with the lower pinion omitted.
Figure 2:
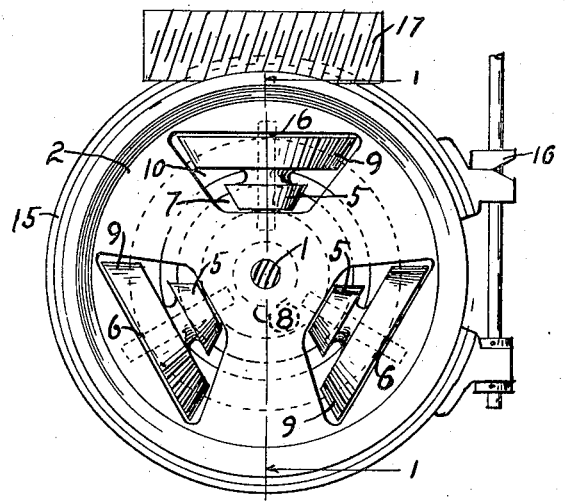
Fig. 2 is a sectional view on line 2—2 of Fig. 1.

Referring more particularly to the drawing, 1 indicates a bearing shaft such as shown in my Patent No. 1,317,075, of Sept. 23, 1919. Shaft 1 has a web 2 mounted thereon and fixed against lateral displacement by means of collars 4—4$^a$, said web 2 having pinions 5—5—5 revolubly mounted therein on shafts 6—6—6. Meshing with pinions 5 are bevel gears 7—7$^a$ which are fixedly secured to hollow driving shafts 8—8$^a$ revolubly mounted on shaft 1.

At 9—9—9 are shown bevel gears formed integrally with pinions 5—5—5 and in the present case of greater diameter than said pinions and meshing with bevel gears 10—10$^a$, the latter being secured to drums 11—11$^a$ by bolts as 12.

Drums 11—11$^a$ are mounted to revolve on shafts 8—8$^a$ through the medium of bearings 13—13$^a$, the bearings for shafts 8—8$^a$ being shown at 14—14$^a$. Each drum is controlled by means of a suitable brake band as 15—15$^a$, which may be tightened or loosened upon its respective drum in any suitable manner as by engaging cams as indicated at 16. Power is applied to driving shafts 8—8$^a$ through gears 7—7$^a$, pinions 5—5—5, shafts 6—6—6, web 2 and, in the present case, worm drive 17.

Under ordinary conditions all of the parts indicated by the numerals 2, 5, 6, 7, 7$^a$, 8, 8$^a$, 9, 10, 10$^a$, 11, 11$^a$ revolve as a unitary structure when put into operation by gear connection 17. If however, the brake is applied to one drum as 11$^a$ the gears and pinions 9 and 5 respectively are caused to revolve upon their shafts 6 in the direction indicated by the arrow through the medium of gear 10$^a$ fixed to the braked drum. The revolving of gears 9 and pinions 5 necessarily cause the shafts 8—8$^a$ to revolve through the medium of bevel gears 7—7$^a$, these shafts obviously being caused to rotate at unequal rates of speed in the same direction, thereby slowing down shaft 8$^a$ and accelerating shaft 8, the desired relative speeds of rotation being secured by the operation of the proper brake.

It is clear from the above description that in a device of this nature the gears 9 and pinions 5 may be proportioned to secure any desired effect upon the speed of the driven shafts 8 and 8$^a$. The invention hereinbefore described does not reside in the specific construction above set forth but in causing pinions 5 to rotate in either direction as desired thereby slowing down the speed of rotation of one driving shaft and accelerating the speed of rotation of the other driving shaft.

It is understood therefore, that changes in form, construction, proportions and method of operation may be made within the scope of the appended claims.

I claim:—

1. A transmission mechanism including a bearing shaft, a pair of opposed driving shafts mounted thereon and carrying opposed gears, a member mounted to rotate about said bearing shaft between said opposed gears, pinions mounted in said member in permanent engagement with said opposed gears, braking means revolubly mounted on each of said opposed shafts, a gear of larger diameter than said pinions mounted integrally with each of said pinions and in axial alinement therewith, and permanent gear connections between each of said braking means and said larger gears.

2. A transmission mechanism including a bearing shaft, a pair of opposed driving shafts mounted thereon and carrying opposed gears, a member mounted on said bearing shaft between said opposed gears, pinions mounted in said member in permanent engagement with said opposed gears, braking means revolubly mounted on each of said opposed shafts, a gear mounted upon each of said braking means, and a gear mounted integrally with each of said pinions and in permanent engagement with said last mentioned gears.

ELVIN T. COUSE.